US007787764B2

United States Patent
Hung et al.

(10) Patent No.: US 7,787,764 B2
(45) Date of Patent: *Aug. 31, 2010

(54) OPTICAL NETWORK TRANSMISSION CHANNEL FAILOVER SWITCHING DEVICE

(75) Inventors: Fu-Chun Hung, Taipei (TW); Hsuan-Hung Wu, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 635 days.

This patent is subject to a terminal disclaimer.

(21) Appl. No.: 11/748,328

(22) Filed: May 14, 2007

(65) Prior Publication Data

US 2008/0152340 A1 Jun. 26, 2008

(30) Foreign Application Priority Data

Dec. 20, 2006 (TW) .............................. 95147831 A

(51) Int. Cl.
G02F 1/00 (2006.01)
(52) U.S. Cl. .............................. 398/5; 370/227; 714/4; 398/12; 398/19; 398/22
(58) Field of Classification Search ...................... 398/1, 398/2, 5, 9, 12, 16, 19, 22
See application file for complete search history.

(56) References Cited

U.S. PATENT DOCUMENTS

| 4,878,726 | A | * | 11/1989 | Fatehi | 385/16 |
|---|---|---|---|---|---|
| 5,214,728 | A | * | 5/1993 | Shigematsu et al. | 385/24 |
| 5,414,414 | A | * | 5/1995 | Suzuki | 340/825.01 |
| 5,510,917 | A | * | 4/1996 | Corke et al. | 398/34 |
| 5,717,796 | A | * | 2/1998 | Clendening | 385/24 |
| 5,757,526 | A | * | 5/1998 | Shiragaki et al. | 398/20 |
| 5,778,116 | A | * | 7/1998 | Tomich | 385/16 |
| 5,896,474 | A | * | 4/1999 | Van Deventer et al. | 385/24 |
| 6,323,974 | B1 | * | 11/2001 | Harris et al. | 398/2 |
| 6,327,400 | B1 | * | 12/2001 | Harstead et al. | 385/22 |
| 6,396,969 | B1 | * | 5/2002 | Sparks et al. | 385/16 |
| 6,421,149 | B2 | * | 7/2002 | Tervonen et al. | 398/9 |
| 6,816,680 | B2 | * | 11/2004 | Purse et al. | 398/5 |
| 6,980,711 | B2 | * | 12/2005 | Feinberg et al. | 385/16 |
| 7,024,110 | B2 | * | 4/2006 | Jasti | 398/5 |
| 7,110,668 | B2 | * | 9/2006 | Gerstel et al. | 398/5 |
| 7,340,170 | B2 | * | 3/2008 | Park et al. | 398/67 |
| 7,376,348 | B2 | * | 5/2008 | Hasuo et al. | 398/5 |
| 7,599,618 | B2 | * | 10/2009 | Adam et al. | 398/16 |
| 2001/0046074 | A1 | * | 11/2001 | Kakizaki et al. | 359/110 |
| 2002/0071148 | A1 | * | 6/2002 | Purse et al. | 359/110 |
| 2002/0197004 | A1 | * | 12/2002 | Feinberg et al. | 385/24 |
| 2003/0035175 | A1 | * | 2/2003 | Wu et al. | 359/139 |
| 2004/0247312 | A1 | * | 12/2004 | Hasuo et al. | 398/5 |
| 2007/0154219 | A1 | * | 7/2007 | Feinberg | 398/104 |

* cited by examiner

*Primary Examiner*—Ken N Vanderpuye
*Assistant Examiner*—Tanya Ngo

(57) ABSTRACT

An optical network transmission channel failover switching device is proposed, which is designed for use in conjunction with an optical network for providing a transmission channel failover switching function, which is characterized by the provision of a pair of two-to-two (2×2) optical switches and an optical transceiver module for providing a backup channel monitoring function that can be used to activate the failover switching action. This feature allows the utilization of the optical network system to have enhanced reliability, serviceability, and security.

10 Claims, 3 Drawing Sheets

OPTICAL NETWORK TRANSMISSION CHANNEL FAILOVER SWITCHING DEVICE

BACKGROUND OF THE INVENTION

1. Field of the Invention

This invention relates to optical networking technology, and more particularly, to an optical network transmission channel failover switching device which is designed for use with an optical network, such as a local area network used for linking Internet to the clients or a telephone network, for the purpose of providing the optical network with a transmission channel failover switching function.

2. Description of Related Art

Optical networking is a communication technology that utilizes optical fibers and laser beams for data transmission between computers, telephones and other electronic devices. Optical networks can be used to transmit signals either in analog or digital forms. Since laser beams are much higher in frequency than electrical and radio signals, optical networking is far more reliable and has far greater transmission capacity than traditional cable and radio communications.

PON (Passive Optical Network) systems are a widely employed technology for data communication between the Internet and local area networks that are used for connection to private users and small business entities. In practice, a PON system typically utilizes just one single strand of optical fiber for two-way transmission of optical signals to and from the client sites. One drawback to the traditional single-fiber two-way PON systems, however, is that when the single fiber is damaged or fractured, the data communication to the client sites is entirely disconnected. One solution to this problem is to provide two channels (i.e., two strands of fibers) in the optical transmission path: a primary channel and a secondary channel, where the primary channel is initially set to be responsible for optical transmission while the secondary channel is set to standby mode, such that in the event of a failure to the primary channel (such as when fractured), the failed primary channel can be failover switched to the backup channel.

To achieve the above-mentioned failover purpose, it is needed to develop an optical transmission channel failover switching device capable of switching the primary channel over to the backup channel in the event of a failure to the primary channel. Presently, one solution is to utilize two one-to-two (1×2) optical switches in an optical auto switch (OAS) to provide the desired failover switching function. One drawback to this solution, however, is that it lacks the capability of monitoring the backup channel to check whether the backup channel is in good usable condition when the primary channel fails. As a consequence, if the backup channel is also in unusable condition when the primary channel fails, it will cause the entire optical network system to shut down, resulting in degraded serviceability and security to network services.

SUMMARY OF THE INVENTION

It is therefore an objective of this invention to provide an optical network transmission channel failover switching device which is capable of providing a backup channel monitoring capability for failover switching of the primary channel.

The optical network transmission channel failover switching device according to the invention is designed for use with an optical network, such as a local area network used for linking to the Internet or a telephone network, for the purpose of providing the optical network with a transmission channel failover switching function.

In architecture, the optical network transmission channel failover switching device according to the invention comprises: (A) an equipment-side interface, which includes an input port and an output port; (B) a channel-side interface, which includes a first transmission port, a second transmission port, a first reception port, and a second reception port; (C) a first optical switching module, which includes a first connecting port, a second connecting port, a third connecting port, and a fourth connecting port, and which is capable of providing a two-to-two optical switching function for selectively connecting the first connecting port and the second connecting port to the third connecting port and the fourth connecting port; wherein the first connecting port is connected to the input port of the equipment-side interface, the second connecting port is used for monitoring beam reception and routing, the third connecting port is connected via the first transmission port of the channel-side interface to the primary channel of the optical fiber, and the fourth connecting port is connected via the second transmission port of the channel-side interface to the backup channel of the optical fiber; (D) a second optical switching module, which includes a first connecting port, a second connecting port, a third connecting port, and a fourth connecting port, and is capable of providing a two-to-two optical switching function for selectively connecting the first connecting port and the second connecting port to the third connecting port and the fourth connecting port; and wherein the first connecting port is connected to the output port of the equipment-side interface, the second connecting port is used for monitoring beam routing, the third connecting port is used for connection via the first input port of the channel-side interface to the primary channel of the optical fiber, and the fourth connecting port is used for connection via the second reception port of the channel-side interface to the backup channel of the optical fiber; (E) an optical transceiver module, which has a receiving end connected to the second connecting port of the second optical switching module and a transmission end connected to the second connecting port of the first optical switching module, for monitoring beam reception and transmission from the second optical switching module and via the first optical switching module to the backup channel of the optical fiber; (F) a first optical sensing module, which is coupled to the first input port of the channel-side interface for detecting whether the primary channel of the optical fiber transmits optical signals normally; and if yes, capable of generating a first opto-electro signal; (G) a second optical sensing module, which is coupled to the second reception port of the channel-side interface for detecting whether the backup channel of the optical fiber transmits the monitoring beam normally; and if yes, capable of generating a second opto-electro signal; and (H) a communication module, which is capable of responding to the first opto-electro signal and the second opto-electro signal by generating a corresponding switching control signal to activate the first optical switching module and the second optical switching module to perform a failover switching action from the failed primary channel to the backup channel.

The optical network transmission channel failover switching device according to the invention is characterized by the provision of a pair of two-to-two (2×2) optical switches and an optical transceiver module for providing a backup channel monitoring function that can be used to activate the failover switching action. This feature allows the utilization of the optical network system to have enhanced reliability, serviceability, and security.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The optical network transmission channel failover switching device according to the invention is disclosed in full details by way of preferred embodiments in the following with reference to the accompanying drawings.

Figure 1A:
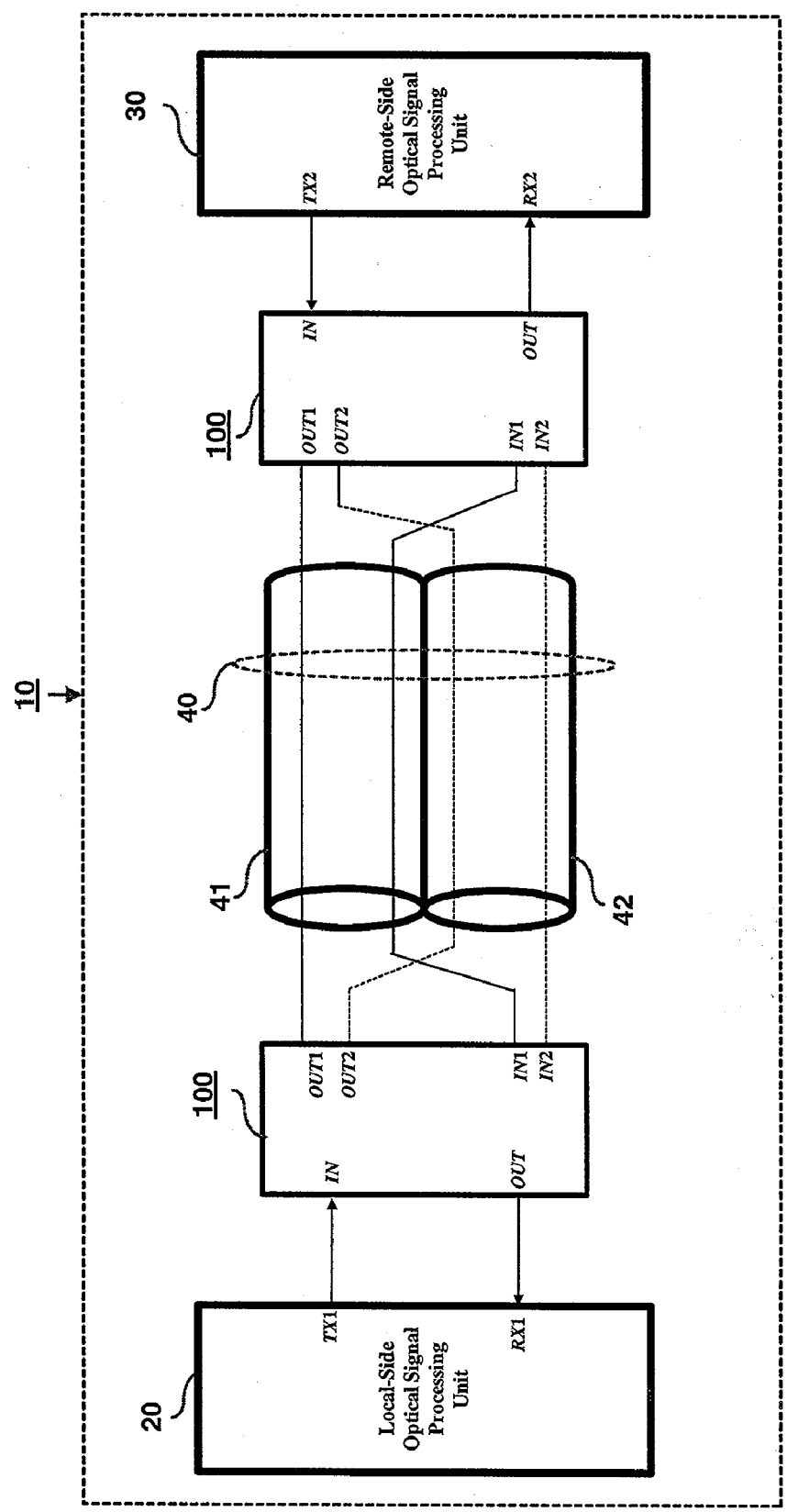
FIG. 1A is a schematic diagram showing the application of the optical network transmission channel failover switching device of the invention with a typical type of optical network system.
Figure 1B:
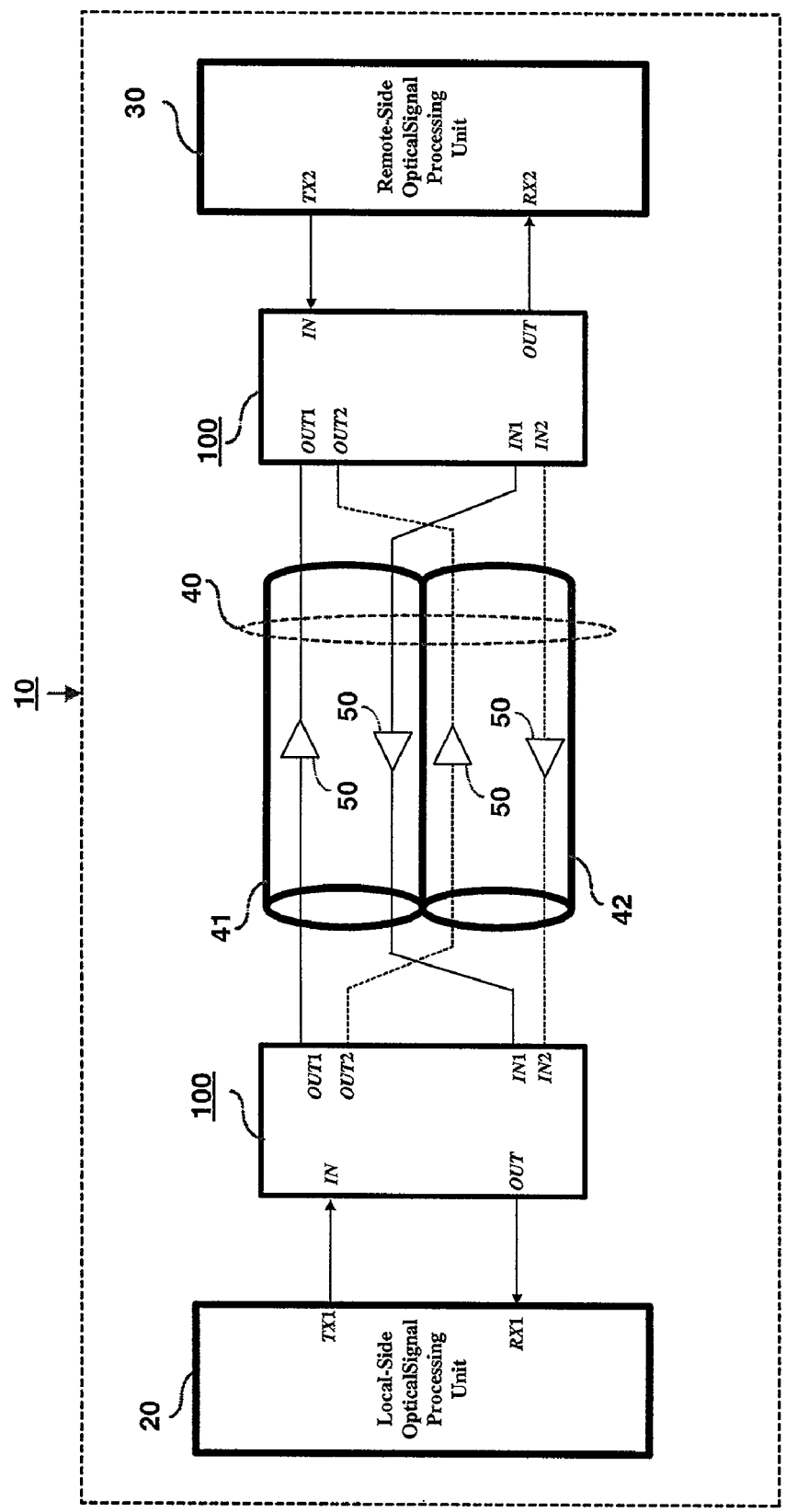
FIG. 1B is a schematic diagram showing the application of the invention with an advanced type of optical network system having EDFA circuitry.

FIGS. 1A-1B are two schematic diagrams used to illustrate the application of the optical network transmission channel failover switching device according to the invention (as the block indicated by the reference numeral 100) with an optical network system 10. It is to be noted that in this application, two devices of the invention should be used. FIG. 1A shows the application of the invention with a typical optical network system, while FIG. 1B shows the application of the invention with an advanced type of optical network system that is equipped with EDFA (Erbium-Doped Fiber Amplifier) modules 50.

As shown, the optical network system 10 is equipped with a local-side optical signal processing unit 20 and a remote-side optical signal processing unit 30 which are interconnected to each other via an optical fiber 40 having a primary channel 41 and a backup channel 42. The backup channel 42 is used as a redundant backup for the primary channel 41. In Internet applications, for example, the optical network system 10 can be a PON (Passive Optical Network) system, and the local-side optical signal processing unit 20 is an optical line terminal (OLT), while the remote-side optical signal processing unit 30 is an optical network unit (ONU). The local-side optical signal processing unit 20 and the remote-side optical signal processing unit 30 each have a beam emitting port TX1, TX2 for emitting an optical signal beam to the opposite side and a beam reception port RX1, RX2 for receiving the optical signal beam from the opposite side.

In practice, the primary channel 41 is used as the main transmission route for the local-side optical signal processing unit 20 and the remote-side optical signal processing unit 30 to exchange optical signals, i.e., the local-side optical signal processing unit 20 can output an optical signal from its beam emitting port TX1 and transmit the outputted optical signal via the primary channel 41 of the optical fiber 40 to the beam reception port RX2 of the remote-side optical signal processing unit 30; and vice versa, the remote-side optical signal processing unit 30 can output an optical signal from its beam emitting port TX2 and transmit the outputted optical signal also via the primary channel 41 of the optical fiber 40 to the beam reception port RX1 of the local-side optical signal processing unit 20. In the event of a failure to the primary channel 41, the two optical network transmission channel failover switching devices of the invention 100 will be simultaneously activated for failover switching to the backup channel 42, such that under this condition, the local-side optical signal processing unit 20 and the remote-side optical signal processing unit 30 can nevertheless use the backup channel 42 for exchange of optical signals.

Figure 2:
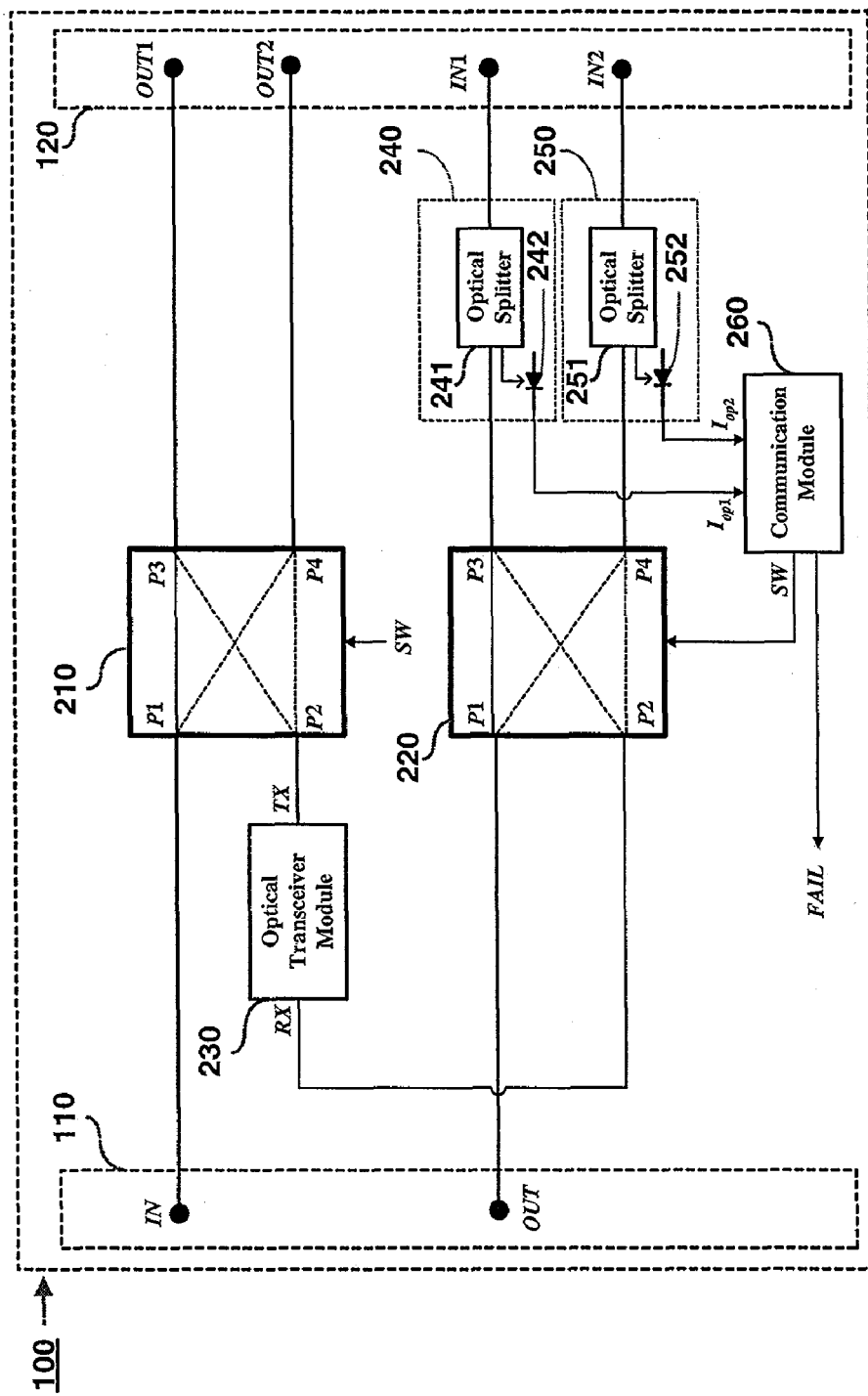
FIG. 2 is a schematic diagram showing a modularized architecture of the optical network transmission channel failover switching device of the invention.

As shown in FIG. 2, the optical network transmission channel failover switching devices of the invention 100 each comprises: (A) an equipment-side interface 110; (B) a channel-side interface 120; (C) a first optical switching module 210; (D) a second optical switching module 220; (E) an optical transceiver module 230; (F) a first optical sensing module 240; (G) a second optical sensing module 250; and (H) a communication module 260. Firstly, the respective attributes and behaviors of these modules are described in details in the following.

The equipment-side interface 110 is used for coupling to either the local-side optical signal processing unit 20 or the remote-side optical signal processing unit 30, and which includes an input port IN and an output port OUT. As shown in FIGS. 1A-1B, its input port IN is used for connection to either the beam emitting port TX1 of the local-side optical signal processing unit 20 or the beam emitting port TX2 the remote-side optical signal processing unit 30, while its output port OUT is used for connection to the beam reception port RX1/RX2 of the same.

The channel-side interface 120 is used for coupling to the optical fiber 40, and which includes a first transmission port OUT1, a second transmission port OUT2, a first reception port IN1, and a second reception port IN2. As shown in FIGS. 1A-1B, the first transmission port OUT1 is used for connection to the primary channel 41, the second transmission port OUT2 is used for connection to the backup channel 42, the first input port IN1 is used for connection to the primary channel 41, and the second reception port IN2 is used for connection to the backup channel 42.

The first optical switching module 210 is a 2×2 (two-to-two) type of optical switch, which includes a first connecting port P1, a second connecting port P2, a third connecting port P3, and a fourth connecting port P4, and which is capable of providing a two-to-two optical switching function for selectively connecting the first connecting port P1 and the second connecting port P2 to the third connecting port P3 and the fourth connecting port P4. In assembly, the first connecting port P1 is connected to the input port IN of the equipment-side interface 110; the second connecting port P2 is used for reception of a monitoring beam from the optical transceiver module 230; the third connecting port P3 is connected via the first transmission port OUT1 of the channel-side interface 120 to the primary channel 41 of the optical fiber 40; and the fourth connecting port P4 is connected via the second transmission port OUT2 of the channel-side interface 120 to the backup channel 42 of the optical fiber 40. The switching action of the first optical switching module 210 is controlled by a switching control signal SW for selectively connecting the first connecting port P1 and the second connecting port P2 to the third connecting port P3 and the fourth connecting port P4.

The second optical switching module 220 is likewise a 2×2 (two-to-two) type of optical switch, which includes a first connecting port P1, a second connecting port P2, a third connecting port P3, and a fourth connecting port P4, and which is capable of providing a two-to-two optical switching function for selectively connecting the first connecting port P1 and the second connecting port P2 to the third connecting port P3 and the fourth connecting port P4. In assembly, the first connecting port P1 is connected to the output port OUT of the equipment-side interface 110; the second connecting port P2 is used for monitoring beam transfer to the optical transceiver module 230; the third connecting port P3 is used for connection via the first input port IN1 of the channel-side interface 120 to the primary channel 41 of the optical fiber 40; and the fourth connecting port P4 is used for connection via the second reception port IN2 of the channel-side interface 120 to the backup channel 42 of the optical fiber 40. The switching action of the second optical switching module 220 is also controlled by the above-mentioned switching control signal SW for connecting the first connecting port P1 and the second connecting port P2 selectively to the third connecting port P3 and the fourth connecting port P4.

The optical transceiver module 230 has a receiving end RX and a transmission end TX, wherein the receiving end RX is connected to the second connecting port P2 of the second optical switching module 220, while the transmission end TX is connected to the second connecting port P2 of the first optical switching module 210. In operation, the optical transceiver module 230 is used for reception and transmission of a monitoring beam routed through the P2-P4 connection of the second optical switching module 220 from the second reception port IN2 of the channel-side interface 120, where the received monitoring beam is subsequently transmitted through the P2-P4 connection of the first optical switching module 210 and via the second transmission port OUT2 to the backup channel 42 of the optical fiber 40. In practice, for example, the optical transceiver module 230 has a center wavelength of 1550 nm (nanometer), which is suitable for adaptation with the EDFA devices 50 in the optical network system 10.

The first optical sensing module 240 is coupled to the first input port IN1 of the channel-side interface 120 for detecting whether the primary channel 41 of the optical fiber 40 can transmit optical signals normally. If the primary channel 41 can work normally, the optical signal beam transmitting therein will be sensed by the first optical sensing module 240, causing the generation of a first opto-electro signal $I_{op1}$. In practice, for example, this first optical sensing module 240 is implemented with an optical splitter 241 and a photo diode (PD) 242; wherein the optical splitter 241 is connected via the first input port IN1 of the channel-side interface 120 to the primary channel 41 of the optical fiber 40 for intercepting the optical signal beam in the primary channel 41; while the photo diode 242 is capable of sensing the optical beam intercepted by the optical splitter 241 and responsively generating the first opto-electro signal $I_{op1}$.

The second optical sensing module 250 is coupled to the second reception port IN2 of the channel-side interface 120 for detecting whether the backup channel 42 of the optical fiber 40 can transmit optical signals normally. If the backup channel 42 can work normally, the optical beam (i.e., the above-mentioned monitoring beam) transmitting therein will be sensed by the second optical sensing module 250, thus causing the generation of a second opto-electro signal $I_{op2}$. In practice, for example, this second optical sensing module 250 is implemented with an optical splitter 251 and a photo diode (PD) 252; wherein the optical splitter 251 is connected via the second reception port IN2 of the channel-side interface 120 to the backup channel 42 of the optical fiber 40 for intercepting the monitoring beam in the backup channel 42; while the photo diode 252 is capable of sensing the monitoring beam intercepted by the optical splitter 251 and responsively generating the second opto-electro signal $I_{op2}$.

The communication module 260 is capable of responding to the first opto-electro signal $I_{op1}$ and the second opto-electro signal $I_{op2}$ by generating a corresponding switching control signal SW to activate the first optical switching module 210 and the second optical switching module 220 to perform a failover switching action between the primary channel 41 and the backup channel 42 of the optical fiber 40. In practice, the switching control signal SW can be implemented in such a manner that when the light intensity at the first input port IN1 is higher than a threshold value (indicating that the primary channel 41 can operate normally), then SW=0 and thus no failover switching action is activated; and when the light intensity at the first input port IN1 isn't only lower than the threshold value (indicating that the primary channel 41 fails to work normally) but the light intensity at the second reception port IN2 is higher than the threshold value (indicating that the backup channel 42 can work normally), then SW=1 and a failover switching action is enabled. In practice, for example, the communication module 260 is integrated to an ERC (Embedded Remote Communication) circuit. Moreover, if the light intensity at the second reception port IN2 is lower than the threshold value, it indicates that the backup channel 42 also fails to work normally, and the communication module 260 will responsively generate a backup-channel failure notifying message FAIL and display the FAIL message on a network workstation (not shown) or directly on the local-side optical signal processing unit 20 or the remote-side optical signal processing unit 30 with a flashing light or beep to notify the network management personnel to perform maintenance work on the optical fiber 40.

The following is a detailed description of a practical application example of the optical network transmission channel failover switching devices of the invention 100 during actual operation.

At start of operation, the optical network transmission channel failover switching devices of the invention 100 are preset to connect both the local-side optical signal processing unit 20 and the remote-side optical signal processing unit 30 to the primary channel 41 of the optical fiber 40; i.e., initially, the first optical switching module 210 is preset to connect its first connecting port P1 to the third connecting port P3 and its second connecting port P2 to the fourth connecting port P4; and similarly, the second optical switching module 220 also connects its first connecting port P1 to the third connecting port P3 and its second connecting port P2 to the fourth connecting port P4. This connection state allows the local-side optical signal processing unit 20 and the remote-side optical signal processing unit 30 to exchange optical signals via the primary channel 41.

When the primary channel 41 operates normally, the optical signal beam transmitting therein will be intercepted by the optical splitter 241 of the first optical sensing module 240 and then sensed by the photo diode 242. If the light intensity is higher than a preset threshold value, it causes the photo diode 242 to generate a first opto-electro signal $I_{op1}$. In this case, the communication module 260 responsively outputs SW=0, which causes no switching action to the first optical switching module 210 and the second optical switching module 220. Therefore, the first optical switching module 210 and the second optical switching module 220 remain connected to the primary channel 41 for transmission of optical signal beams.

On the other hand, in the event of a failure to the primary channel 41, the light intensity at the first input port IN1 drops below the threshold value, which then causes the output of $I_{op1}$ from the photo diode 242 to be interrupted. In this case, if the backup channel 42 is still in good condition, the monitoring beam transmitting inside the backup channel 42 can be detected by the photo diode 252 of the second optical sensing module 250 (i.e., the light intensity at the second reception port IN2 is higher than the threshold value). This causes the communication module 260 to output SW=1 to enable a switching action to the first optical switching module 210 and the second optical switching module 220. In response, both the first optical switching module 210 and the second optical switching module 220 are switched over to the connection of (P1→P4). At the same time, this switching control signal SW is also transmitted via the backup channel 42 to the opposite side for the optical network transmission channel failover switching device of the invention 100 on the opposite side to perform a similar switching action, i.e., causing both the first optical switching module 210 and the second optical switching module 220 on the opposite side to be switched over to the connection of (P1→P4). As a result, the primary channel 41 is failover switched to the backup channel 42. However, if the light intensity at the second reception port IN2 is also lower than the threshold value, it indicates that the backup channel 42 also fails to work normally, and the communication module 260 will responsively generate a backup-channel failure notifying message FAIL and display the FAIL message on a network workstation (not shown) or directly on the local-side optical signal processing unit 20 or the remote-side optical signal processing unit 30 with a flashing light or beep to notify the network management personnel to perform maintenance work on the optical fiber 40.

During the forgoing operation, when the primary channel 41 operates normally, the monitoring beam from the optical transceiver module 230 is routed via the P1→P4 connection in the second optical switching module 220 for injection into the backup channel 42 of the optical fiber 40. Therefore, the travel route of the monitoring beam is separated from the travel route of the optical signal beams from the beam emitting port TX1 of the local-side optical signal processing unit 20, which effectively reduce the effect of interference between the monitoring beam and the optical signal beam. In addition, since the monitoring beam from the optical transceiver module 230 travels in the same direction as the signal beam from the beam emitting port TX1 of the local-side optical signal processing unit 20, the optical network transmission channel failover switching devices 100 of the invention is particularly suitable for use with the EDFA-equipped optical network system 10 having EDFA devices 50 shown in FIG. 1B.

In conclusion, the invention provides an optical network transmission channel failover switching device which is designed for use with an optical network for providing the optical network with a transmission channel failover switching function, and which is characterized by the provision of a pair of two-to-two (2×2) optical switches and an optical transceiver module for providing a backup channel monitoring function that can be used to activate the failover switching action. This feature allows the utilization of the optical network system to have enhanced reliability, serviceability, and security. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An optical network transmission channel failover switching device for use with an optical network for providing the optical network with a transmission channel failover switching function, wherein the optical network is equipped with a local-side optical signal processing unit and a remote-side optical signal processing unit, each having a beam emitting port and a beam reception port and being interconnected via an optical fiber having at least a primary channel and a backup channel;

the optical network transmission channel failover switching device comprising:

an equipment-side interface, which includes an input port and an output port;

a channel-side interface, which includes a first transmission port, a second transmission port, a first reception port, and a second reception port;

a first optical switching module, which includes a first connecting port, a second connecting port, a third connecting port, and a fourth connecting port, and which is capable of providing a two-to-two optical switching function for selectively connecting the first connecting port and the second connecting port to the third connecting port and the fourth connecting port; wherein the first connecting port is connected to the input port of the equipment-side interface, the second connecting port is used for monitoring beam reception and routing, the third connecting port is connected via the first transmission port of the channel-side interface to the primary channel of the optical fiber, and the fourth connecting port is connected via the second transmission port of the channel-side interface to the backup channel of the optical fiber;

a second optical switching module, which includes a first connecting port, a second connecting port, a third connecting port, and a fourth connecting port, and is capable of providing a two-to-two optical switching function for selectively connecting the first connecting port and the second connecting port to the third connecting port and the fourth connecting port; and wherein the first connecting port is connected to the output port of the equipment-side interface, the second connecting port is used for monitoring beam routing, the third connecting port is used for connection via the first input port of the channel-side interface to the primary channel of the optical fiber, and the fourth connecting port is used for connection via the second reception port of the channel-side interface to the backup channel of the optical fiber;

an optical transceiver module, which has a receiving end connected to the second connecting port of the second optical switching module and a transmission end connected to the second connecting port of the first optical switching module, for monitoring beam reception and transmission from the second optical switching module and via the first optical switching module to the backup channel of the optical fiber;

a first optical sensing module, which is coupled to the first input port of the channel-side interface for detecting whether the primary channel of the optical fiber transmits optical signals normally; and if yes, capable of generating a first opto-electro signal;

a second optical sensing module, which is coupled to the second reception port of the channel-side interface for detecting whether the backup channel of the optical fiber transmits the monitoring beam normally; and if yes, capable of generating a second opto-electro signal; and a communication module, which is capable of responding to the first opto-electro signal and the second opto-electro signal by generating a corresponding switching control signal to activate the first optical switching module and the second optical switching module to perform a failover switching action from the failed primary channel to the backup channel.

2. The optical network transmission channel failover switching device of claim 1, wherein the optical network system is a PON (Passive Optical Network) system.

3. The optical network transmission channel failover switching device of claim 1, wherein the optical network system is an EDFA (Erbium-Doped Fiber Amplifier) equipped type of optical network system.

4. The optical network transmission channel failover switching device of claim 1, wherein the optical network system is a telephone-oriented optical network system.

5. The optical network transmission channel failover switching device of claim 1, wherein the local-side optical signal processing unit is an OLT (Optical Line Terminal) module.

6. The optical network transmission channel failover switching device of claim 1, wherein the remote-side optical signal processing unit is an ONU (Optical Network Unit) module.

7. The optical network transmission channel failover switching device of claim 1, wherein the optical transceiver module has a receiving end connected to the second connecting port of the second optical switching module and a transmission end connected to the second connecting port of the first optical switching module.

8. The optical network transmission channel failover switching device of claim 1, wherein the first optical sensing module includes:
   an optical splitter, which is coupled via the third connecting port of the second optical switching module to the primary channel of the optical fiber for intercepting the optical data beams transmitting in the primary channel; and
   a photo diode, for sensing the light intensity of the intercepted beam by the optical splitter.

9. The optical network transmission channel failover switching device of claim 1, wherein the second optical sensing module includes:
   an optical splitter, which is coupled via the fourth connecting port of the second optical switching module to the backup channel of the optical fiber for intercepting the monitoring beam transmitting in the backup channel; and
   a photo diode, for sensing the light intensity of the intercepted beam by the optical splitter.

10. The optical network transmission channel failover switching device of claim 1, wherein the communication module is further capable of generating a backup channel failure notifying message in response to an event of a failure to the backup channel of the optical fiber.

\* \* \* \* \*